(12) United States Patent
Volkmann

(10) Patent No.: US 7,354,469 B2
(45) Date of Patent: Apr. 8, 2008

(54) VACUUM CONVEYOR DEVICE WITH A MULTI-STAGE FILTER SYSTEM

(75) Inventor: Thilo Volkmann, Soest (DE)

(73) Assignee: Volkmann GmbH, Soest (DE)

( * ) Notice: Subject to any disclaimer, the term of this patent is extended or adjusted under 35 U.S.C. 154(b) by 307 days.

(21) Appl. No.: 10/912,650

(22) Filed: Aug. 5, 2004

(65) Prior Publication Data

US 2005/0060969 A1    Mar. 24, 2005

(30) Foreign Application Priority Data

Aug. 5, 2003    (DE) ................................ 203 12 074

(51) Int. Cl.
*B01D 46/00*    (2006.01)

(52) U.S. Cl. ............................ 55/482; 55/498; 55/502; 55/507; 55/509; 55/510; 55/521; 55/283; 55/302; 95/280; 96/428

(58) Field of Classification Search .................. 55/302, 55/482, 498, 502, 507, 509, 510, 521, 283; 95/280; 96/428
See application file for complete search history.

(56) References Cited

U.S. PATENT DOCUMENTS

| | | | | |
|---|---|---|---|---|
| 3,973,935 | A | * | 8/1976 | Moore et al. .................. 55/302 |
| 5,830,250 | A | * | 11/1998 | Shirk et al. .................... 55/498 |
| 6,383,244 | B1 | * | 5/2002 | Wake et al. ................... 55/482 |
| 6,936,085 | B2 | * | 8/2005 | DeMarco ....................... 55/324 |
| 2002/0112459 | A1 | * | 8/2002 | Andress et al. ................ 55/498 |
| 2002/0152732 | A1 | * | 10/2002 | Kallsen et al. ................. 55/482 |
| 2003/0041729 | A1 | * | 3/2003 | Finigan ......................... 95/26 |

FOREIGN PATENT DOCUMENTS

| | | |
|---|---|---|
| DE | 44 27 753 C2 | 2/1996 |
| DE | 195 08 815 A1 | 9/1996 |
| DE | 298 20 837 U1 | 2/1999 |
| DE | 199 30 614 A1 | 1/2001 |
| DE | 201 04 481 U | 7/2001 |
| WO | WO 98/19772 | 5/1998 |
| WO | WO 99/43412 | 9/1999 |
| WO | WO 99/47237 | 9/1999 |

* cited by examiner

*Primary Examiner*—Duane Smith
*Assistant Examiner*—Minh-Chau T. Pham
(74) *Attorney, Agent, or Firm*—Fay Sharpe LLP

(57) ABSTRACT

A Vacuum conveyor device (10) with a multi-stage filter system, has at least one inner filter (10A), one outer filter (10B), and one filter adapter (20) especially for air-tight and/or fluid-tight insertion of at least one of the filters, for which the outer filter is arranged up-stream of the inner filter. In order of preparing a filter system for a vacuum conveyor device, which features both the cleaning-related elements of conventional filters and also the safety-related advantages of multi-stage systems, but which remains compact in structure, the one or more inner filters (10A) are used as carrier units for the one or more outer filters (10B) that can be mounted on or inserted into these inner filters and can be connected or are connected to the filter adapters (20).

37 Claims, 3 Drawing Sheets

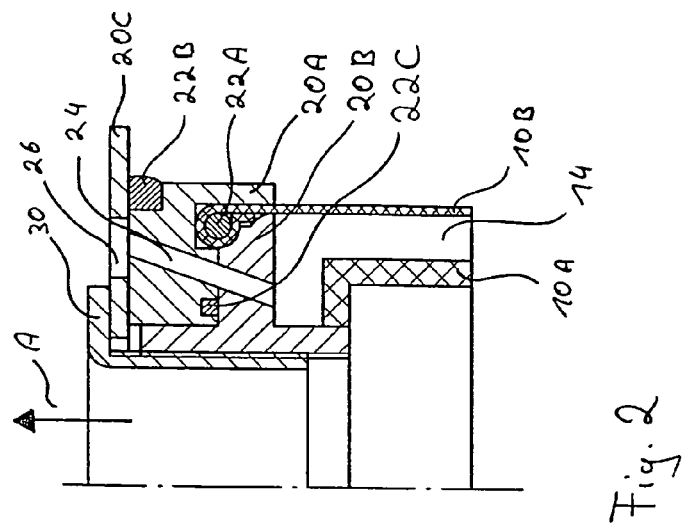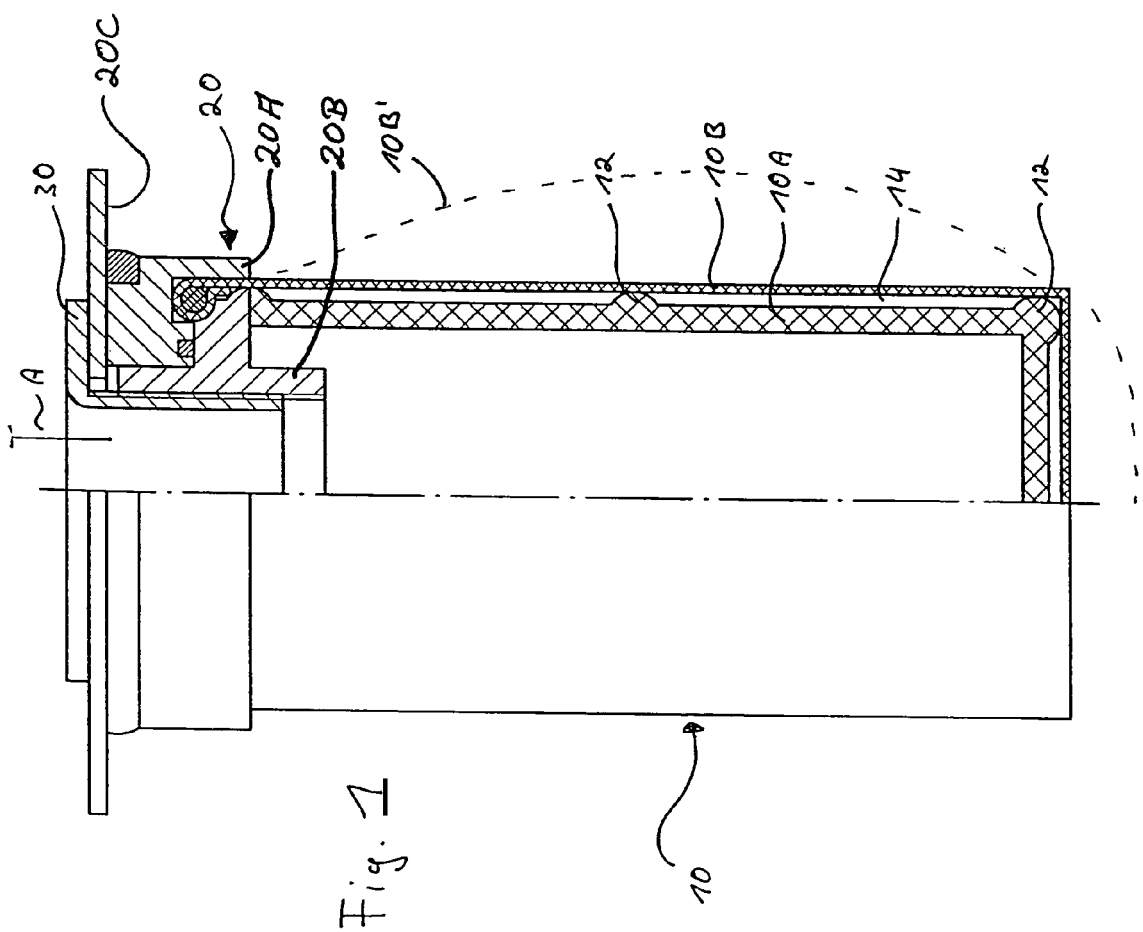

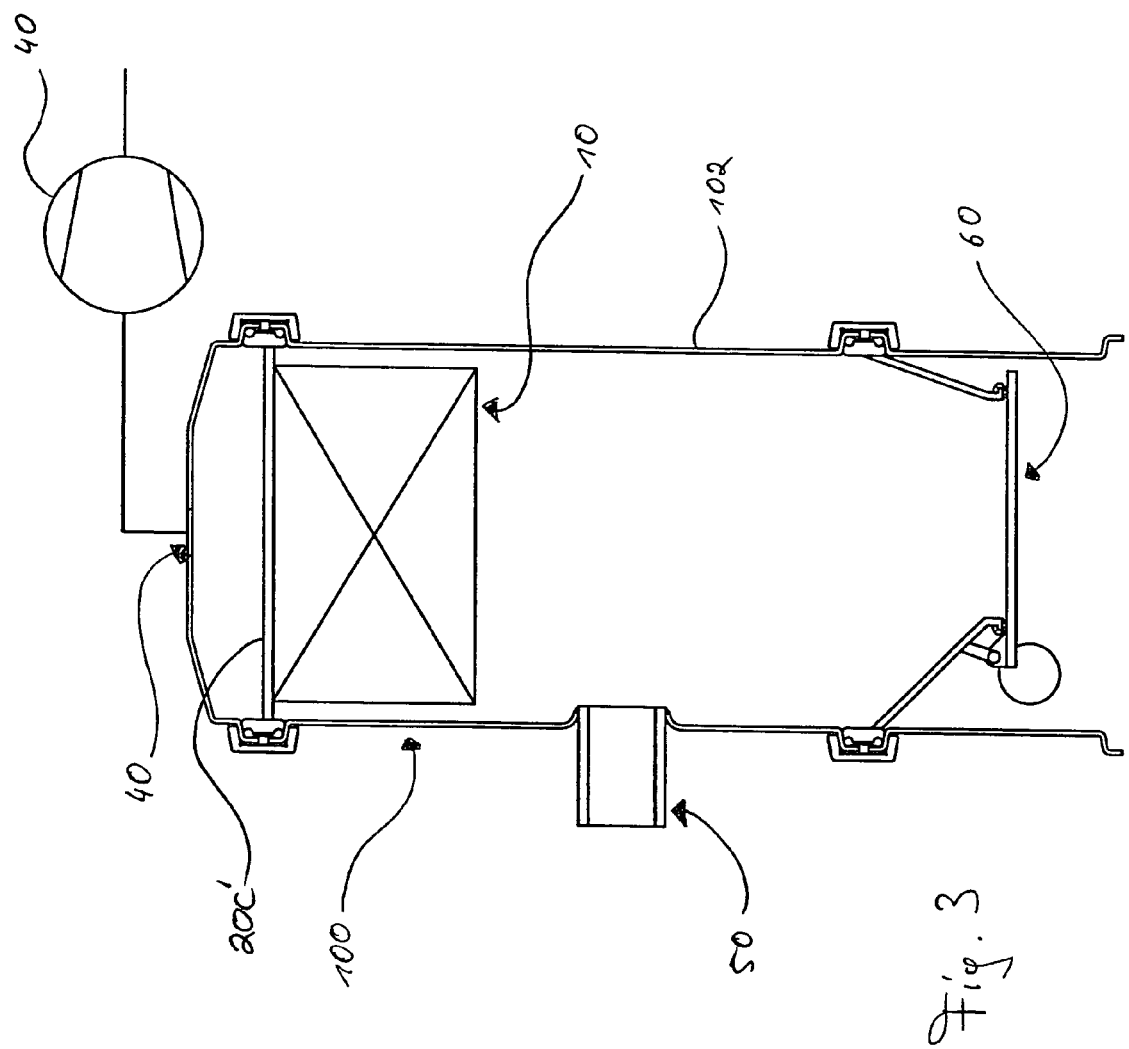

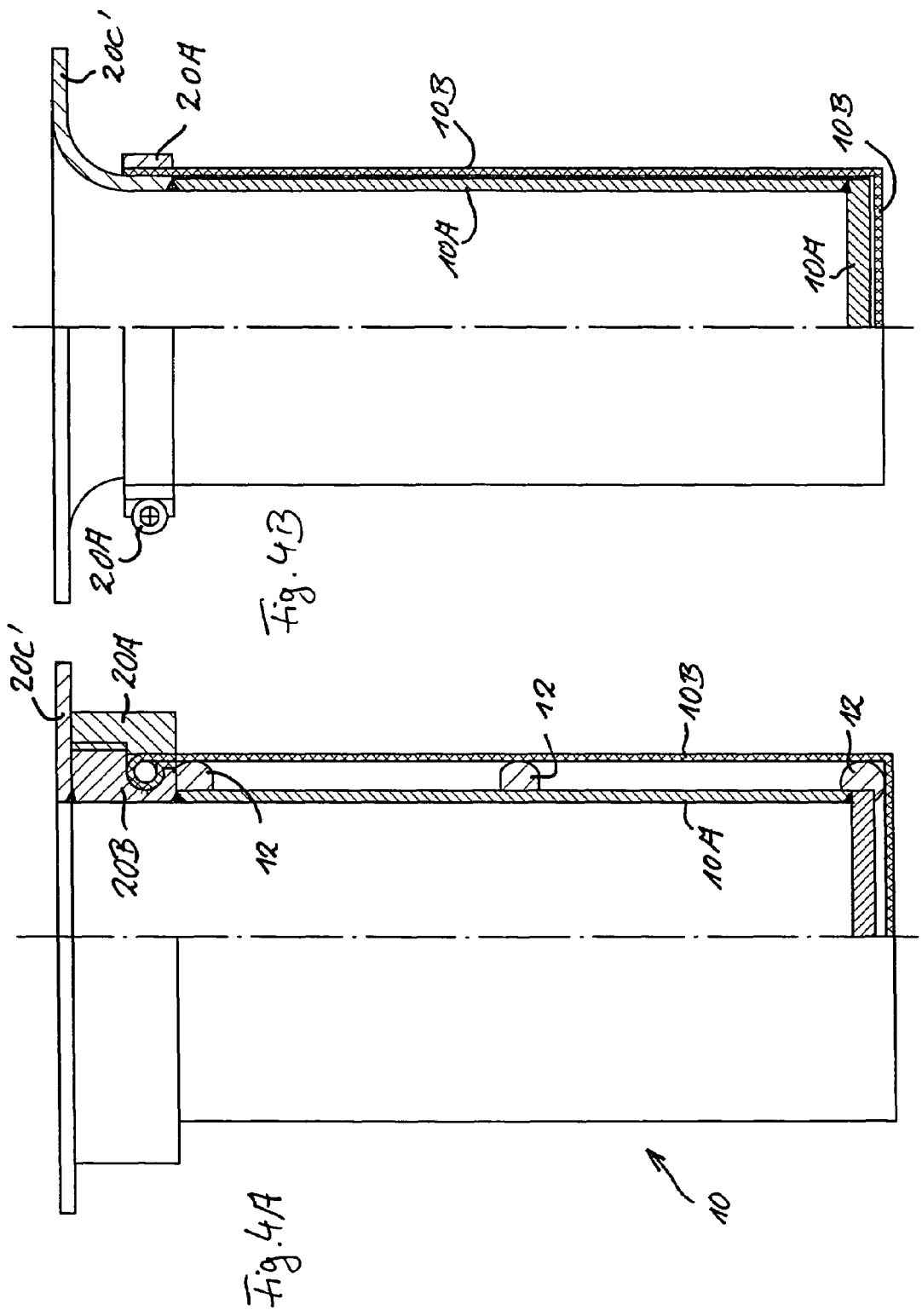

VACUUM CONVEYOR DEVICE WITH A MULTI-STAGE FILTER SYSTEM

The invention pertains to a vacuum conveyor device with a multi-stage filter system, which has at least one inner filter, one outer filter, and one filter adapter especially for air-tight and/or fluid-tight insertion of at least one of the filters, for which the outer filter is arranged upstream of the inner filter.

BACKGROUND OF THE INVENTION

Vacuum conveyors transport material (powder, granulate, dust, tablets, small parts, etc.) using a stream of suction gas, usually air or an inert gas.

The material is suctioned from a feeding point, e.g., with a hand suction pipe, feeding hopper, or the like, transported through a tube or pipeline, and led into the vacuum conveyor by means of a suction opening. In the vacuum conveyor, an inserted filter element separates the transported material from the suction gas, usually supported by centrifugal force and sedimentation. The transported material is collected in the trap container of the vacuum conveyor. The filtered suction gas stream leaves the trap container and flows through the vacuum pump driving the conveyor process, which is typically tightly installed directly on the top part of the vacuum conveyor and is to be protected from contamination, independently of decreasing the environmental impact. After a successful filling process of the trap container, the vacuum pump is turned off or the suction gas stream is interrupted by a valve on the filtered (pure) gas side between the trap container and the vacuum pump.

In a standard vacuum conveyor, a discharge valve arranged at the bottom in the trap container is then opened and the transported material falls out of the trap container through the discharge opening.

Bridge-forming materials can be forced out of the trap container by fluidization or excess pressure aids. The adhered filter cakes in the filter are washed by means of a counter airflow outwards from the pure gas side. The duration of the individual suction and discharge cycles is typically regulated by means of cycle control with adjustable suction and discharge times. Suction and discharge times are typically relatively short for vacuum conveyors and usually equal only a few seconds each. Because the filter cakes can be washed quite frequently, this short cycling allows for an extremely compact structural shape with extremely small filter surfaces (in comparison with flow rates in typical air filter systems).

The high flow rates and the alternating load direction, which usually changes several times per minute (suction, counter flow pulse), set strict requirements on filter systems for vacuum conveyor devices. The filter system solutions known from the prior art are often not designed for these requirements. These solutions include, in particular, so-called filter cartridges made from sintered plastics, metals, or ceramic materials, and so-called deep-bed filters, which are shaped as rigid pipes closed on one end.

The suctioned gas passes the pores of the filter, while the transported material or the fine material portion adhered to the filter is stopped on the surface of the filter and embedded at a certain depth in the pores of the filter. The result is an increased differential pressure in the filter, which can lead to the appearance of fatigue in the filter due to the frequently changing forces and ultimately to filter breakdown. The fineness of this filter typically equals 1-1.5 µm for vacuum conveyors.

In addition, one-stage surface filters made from flexible planar material are known. They usually operate with a very fine filter fabric or filter fleece with an attached membrane layer, which is also in the position to retain very fine particles (for materials >0.1 µm). However, in vacuum conveyors, this fine filter layer is exposed to high loads, like extremely frequent impact of fast particles, so that membranes can be destroyed relatively quickly. These filter materials are typically folded in the form of a star like automotive air filters, in order to achieve a large filter surface area for low flow rates.

Finally, so-called bag filters are usually made from a felt material, which is often also coated on the flow side with a membrane. Bag filters offer the advantage that they inflate during the counter-airflow filter cleaning and therefore the filter cakes can be washed much better than in other filter systems. Their advantage is simultaneously their disadvantage: the frequent movement of the filter bag leads to large loads on joints, connection points, and the filter membrane.

In order to guarantee that the environmental impact due to residual particles in the already filtered air is kept below a permissible low level also for critical materials, e.g., that are dangerous to human health, the exhaust air from vacuum conveyors is typically forwarded to an exhaust-air cleaning device with only single-stage filters. Alternatively, for further cleaning of the exhaust air of the vacuum conveyor, a so-called police filter can be used, which guarantees the quality of the exhaust air as a second filter stage. This second filter stage can also be used as an additional module downstream of the actual working filter but still before the vacuum pump of the vacuum conveyor. However, in many cases this results in problems in the structural height.

THE INVENTION

Starting with these conditions, the invention is based on the problem of preparing a filter system for a vacuum conveyor device, which features both the cleaning-related elements of conventional filters and also the safety-related advantages of multi-stage systems, but which remains compact in structure.

To solve this problem, a device of the type specified in the introduction is proposed, for which the one or more inner filters are used as carrier units for the one or more outer filters, which can be mounted on these inner filters or inserted into these inner filters and which can be connected to the filter adapters.

The basic idea of a vacuum conveyor device with a multi-stage filter system can be realized in many ways. Here, the filter system consists of at least one inner filter, one outer filter, and one filter adapter, wherein the inner filter carries the outer filter and the filters can be attached or are attached to the filter adapter. In each case, with simple means it is achieved that a compact structural shape is ensured by pushing one filter onto another and a simple assembly and disassembly of the filter system is guaranteed by the use of a filter adapter. Here, the terms inner filter, outer filter, working filter, and safety filter in general designate an entire spectrum of different filters. Here, the orientation designation "inner" refers to the downstream position and "outer" to the upstream position of the two filter/filter groups relative to each other in the state of the filter carrying a flow of the medium to be filtered. The term filter adapter is to be understood in the sense of the invention in that it describes any type of device, which can connect the used filter with the attachment device of a vacuum pump device in any arbitrary way.

To prepare a simple carrier unit with a large filter surface area, the one or more inner filters can have the form of a support basket or can be reinforced itself by such a support basket.

To achieve economical filtration, which produces a particularly low differential pressure and is safe, and also exhibits as much stability as possible for the supporting filter, the one or more supporting inner filters can be configured preferably as sintered or star filters, especially in the form of filter cartridges or support baskets.

In order to take into account the different loading of the individual filters and to reduce the costs associated with exchanging the filters, at least one inner filter can be a safety filter and one outer filter can be a working filter.

To effectively remove possible filter cakes in the filter, the outer filter can be inflated elastically, especially by means of a counter airflow pulse.

To improve the function of the individual filter stages, spacers can be arranged between at least one inner and outer filter pair. The resulting hollow space formations on the one hand prevent direct filter contact and on the other hand are used as differential pressure measurement chambers for measuring differential pressures in the filter. Therefore, e.g., excessive growth of the filter cake (high differential pressure), but especially also a possible filter breakdown (differential pressure becoming smaller) can be determined.

In order to be informed continuously of the functional capability and performance of the filter, especially for handling critical conveyor materials, measurement sensors for measuring the differential pressure between at least one inner filter and one outer filter can be provided. Thus, by referring to the differential pressure measurements, conclusions on the throughput of air and thus on the state of the filter can be made.

If necessary, to permit the measurement sensors to be arranged outside of the filter system, connection channels leading to the measurement sensors can be provided in the filter adapter outside of the hollow spaces between at least one inner and outer filter for measuring differential pressure.

To provide variable and simple-as-possible attachment of the multi-stage filter system to a vacuum pump device by means of the filter adapter, the filter adapter can have multiple parts and individual filter adapter parts can be connected, especially mounted and/or screwed on, air-tight and/or fluid-tight.

To guarantee a connection between the individual filters and/or filter adapter parts and the filter adapter or the filter adapter parts, wherein the connection can be attached or detached quickly but is nevertheless secure and air-tight, the one or more outer filters are provided or can be provided with a sealing ring for detachable connection.

To allow effective cleaning of the outer filter, the one or more inflatable outer filters can be reversibly inflated by a counter air pulse for washing the adhering filter cake and/or the fine material portion. The inflation process increases the surface area by giving the filter curvature. The resulting shear and tensile forces attacking the filter cakes adhering to the surface generate effective cleaning of the filter surface.

The previously mentioned components, as well as the claimed components and the components described in the embodiments and to be used according to the invention have no special exceptional requirements for size, shape, material selection, and technical design, so that the selection criteria known in the field of application can be used without restrictions.

Additional details, features, and advantages of the object of the invention result from the subordinate claims and also from the subsequent description of the associated drawing, in which, as an example, a preferred embodiment of the multi-stage filter system for vacuum conveyor devices according to the invention is described. Here, the drawings show the preferred embodiment of a two-stage filter system.

BRIEF DESCRIPTION OF THE DRAWINGS

In more detail, the drawings show:

FIG. 1, a two-stage filter system of a vacuum conveyor device with a multi-part filter adapter in mounted form in side and longitudinal section view, respectively;

FIG. 2, a second embodiment of a multi-part filter adapter equipped with air channels, enlarged detail view; and also FIG. 3, functional circuit diagram of a vacuum conveyor; and also FIG. 4A/B, alternative embodiments of the filter system according to FIG. 1 with an inner filter tightly connected to a filter plate.

PREFERRED EMBODIMENT

The cylindrical, multi-stage filter system 10 seen from FIG. 1 comprises an inner filter 10A equipped with spacers 12 and carrying an outer filter 10B and a multi-part filter adapter 20. The inner filter 10A is preferably a safety filter in the form of a self-supporting support basket, e.g., made from high-quality polyester fleece or needle felt, if necessary with an applied filter membrane (coated with Teflon) or with a GORE-TEX coating. By means of this feature, the outer filter 10B, preferably a conventional and economical working filter, e.g., made from paper or paper-like materials, is packed, tensioned, or lightly touched. The spacers 12 have the effect that the inner filter 10A and outer filter 10B do not contact each other directly, so that a hollow space 14 remains between these filters. The support basket is oriented opposite the suction flow A, so that the gas flows to its outer side. Next to the actual filter device, FIG. 1 also shows a filter mounting plate 20c of a vacuum conveyor device 100 (FIG. 3) with included screw socket 30 with which the multi-stage filter system 10 can be attached and simultaneously held together with the aid of the filter adapter 20. Arrow A shows the air suction direction of the vacuum pump device 40. The dashed line 10B' around the outer filter 10B indicates the profile that the surface of the outer filter 10B can assume, if necessary, in the reversible, inflated state due to, in particular, a counter air pulse.

In FIG. 2, a cut-out of an alternative, multi-part filter adapter 20 with a connection channel 24 can be seen. The filter adapter is assembled from three parts 20A, 20B, and 20C, wherein 20C can simultaneously be used as a filter mounting plate. When pushed apart, the outer filter 10B, which advantageously has a sealing ring 22A on its upper inlet edge, can be inserted between the filter adapter parts 20A and 20B. This configuration enables an air-tight and/or fluid-tight connection between the outer filter 10B and the two filter adapter parts 20A and 20B. The inner filter 10A can be attached with attachment means, e.g., adhesion, air-tight and/or fluid-tight to the filter adapter part 20B. This provides simple assembly for the outer filter, which, however, is not necessary for the inner safety filter due to its less frequent changing.

As can be seen, a connection channel 14 runs through all three filter adapter parts 20A, 20B, and 20C and thus connects the hollow space 14 between the inner and outer filters to the surroundings. For assembly of a measurement sensor and/or a counter air line, filter adapter part 20C has an opening 26. For secure sealing of the filter adapter parts 20A and 20C, other sealing rings 22B and 22C are used.

In the inverted filter arrangement, the support basket can also be oriented in the direction of the flow A, thus a flow can travel towards its inner side and it can carry the outer filter on its inner side, i.e., also upstream.

From FIG. 3, a vacuum conveyor device 100 can be seen. In this figure, the multi-stage filter system 10, the vacuum pump device 40, a suction port 50, the filter adapter part 20C that can be used as a filter mounting plate 20C', and a discharge device 60 can be recognized symbolically, which are provided in or on the trap housing 102 of the vacuum conveyor device 100.

The two alternative embodiments according to FIGS. 4A and 4B differ from the embodiments according to FIGS. 1 and 2, among other things, in that the inner filter 10A is connected undetachably to a filter plate 20C'. For this purpose, for the embodiment according to FIG. 4A, an annular filter adapter part 20B is connected on one end to the filter plate 20C' and on the other end to the inner filter 10A by welding. Another filter adapter part 20A can be connected and adhered to the filter adapter part 20B by means of an inner/outer threaded connection. As for the embodiments according to FIGS. 1 and 2, the outer filter 10B is sealed on its circumference. Another difference is that the spacers 12 are separate components from the inner filter and these spacers can be replaced or connected to the inner filter, e.g., through adhesion or welding.

For the embodiment according to FIG. 4B, the filter adapter 20 consists of a trumpet-shaped component of a filter plate 10C'. The inner filter 10A is connected to the peripheral edge of the trumpet-like deformation through welding, wherein this inner filter has two parts and consists of a tubular wall part and a plate-like base part, which are connected to each other by welding, as is known for sintered metals or plastics. Alternatively, adhesion gluing is also possible, as, e.g., for sintered plastic filters. The other difference in the embodiment according to FIG. 4B is that the outer filter 10B is pulled over the tubular part of the inner filter 10A without lateral spacing and is held tightly in the region of the trumpet-like deformation by means of a tensioning element, like a clamp (adapter part 20A) in an easily exchangeable manner. In the plate-shaped base region, the outer filter can also contact the inner filter in sealed fashion; but preferably with the release of a gap, which can be maintained, e.g., by a spacer.

LIST OF REFERENCE SYMBOLS

10 Multi-stage filter system
10A Inner filter
10B Outer filter
12 Spacer
14 Hollow space formation
20 Filter adapter
20A First filter adapter part
20B Second filter adapter part
20C Third filter adapter part
20C' Filter plate
22A Sealing ring between adapter and filter
22B First sealing ring between filter adapter parts
22C Second sealing ring between filter adapter parts
24 Connection channel
26 Opening
30 Screw socket
40 Vacuum pump device
50 Suction port
60 Discharge device
100 Vacuum conveyor device
102 Trap housing
A Air suction direction

The invention claimed is:

1. Vacuum conveyor device (10) with a multi-stage filter system, which comprises at least one inner filter (10A), at least one outer filter (10B), and a filter adapter (20) for air-tight and/or fluid-tight insertion of at least one of the filters, for which the outer filter is arranged upstream of the inner filter, wherein:
   the filter adapter (20) is a multi-component assembly, comprising a first filter adapter part (20A) and a second filter adapter part (20B);
   the at least one inner filter (10A) is adapted to be used as a carrier unit for the outer filter (10B) and also as a safety filter;
   the at least one outer filter (10B) is adapted to function as a working filter and can be drawn onto or into the inner filter (10A) in a detachable replaceable manner;
   the first filter adapter part (20A) directly connects the outer filter (10B) in a sealing manner to the second filter adapter part (20B);
   the inner filter is connected to the second filter adapter part (20B); and
   said first and second filter adapter parts (20A,20B) are directly connected to each other and are directly sealed together in an air-tight manner such that said inner filter (10A) carries the outer filter (10B).

2. Vacuum conveyor device according to claim 1, wherein the at least one inner filter has the form of a support basket.

3. Vacuum conveyor device according to claim 1, wherein the at least one inner filter is formed as sintered or star filters, in the form of filter cartridges.

4. Vacuum conveyor device according to claim 1, wherein at least the outer filter (10B) can be inflated elastically, especially by means of counter air pulses.

5. Vacuum conveyor device according to claim 1, wherein one or more spacers (12) for forming a hollow space (14) are arranged between the at least one inner filter and the at least one outer filter.

6. Vacuum conveyor device according to claim 1, further comprising a measurement sensor for differential pressure measurement provided between the at least one inner filter and the at least one outer filter.

7. Vacuum conveyor device according to claim 5, wherein the filter adapter (20) comprises at least one connection channel (24) leading from the hollow space (14) outwards for differential pressure measurement to be performed outside of the hollow space (14) between the at least one inner filter and the at least one outer filter and/or for counter airflow.

8. Vacuum conveyor device according to claim 1, wherein the first and second filter adapter parts are annular and are connected to each other by being pushed or screwed together.

9. Vacuum conveyor device according to claim 1, wherein the at least one outer filter (10B) comprises a sealing ring (22A) for detachable connection to the inner filter and/or the first and second filter adapters (20A, 20B).

10. Vacuum conveyor device according to claim 1, wherein the second is an integral component of a filter plate (20C').

11. A method for cleaning a vacuum conveyor device according to claim 4, wherein the one or more inflatable outer filters are inflated reversibly for washing the adhering filter cake and/or the fine material portion through counter air pulses.

12. Vacuum conveyor device according to claim 2, wherein the at least one inner filter is formed as sintered or star filters, in the form of filter cartridges.

13. Vacuum conveyor device according to claim 2, wherein at least the outer filter (10B) can be inflated elastically, especially by means of counter air pulses.

14. Vacuum conveyor device according to claim 3, wherein at least the outer filter (10B) can be inflated elastically, especially by means of counter air pulses.

15. Vacuum conveyor device according to claim 2, wherein one or more spacers (12) for forming a hollow space (14) are arranged between the at least one inner filter and the at least one outer filter.

16. Vacuum conveyor device according to claim 3, wherein one or more spacers (12) for forming a hollow space (14) are arranged between the at least one inner filter and the at least one outer filter.

17. Vacuum conveyor device according to claim 4, wherein one or more spacers (12) for forming a hollow space (14) are arranged between the at least one inner filter and the at least one outer filter.

18. Vacuum conveyor device according to claim 2, further comprising a measurement sensor for differential pressure measurement provided between the at least one inner filter and the at least one outer filter.

19. Vacuum conveyor device according to claim 3, further comprising a measurement sensor for differential pressure measurement provided between the at least one inner filter and the at least one outer filter.

20. Vacuum conveyor device according to claim 4, further comprising a measurement sensor for differential pressure measurement provided between the at least one inner filter and the at least one outer filter.

21. Vacuum conveyor device according to claim 5, further comprising a measurement sensor for differential pressure measurement provided between the at least one inner filter and the at least one outer filter.

22. Vacuum conveyor device according to claim 6, wherein the filter adapter (20) comprises at least one connection channel (24) leading from the hollow space (14) outwards for differential pressure measurement to be performed outside of the hollow space (14) between the at least one inner filter and the at least one outer filter and/or for counter airflow.

23. Vacuum conveyor device according to claim 2, wherein the at least one outer filter (10B) comprises a sealing ring (22A) for detachable connection to the inner filter and/or the first and second filter adapters (20A, 20B).

24. Vacuum conveyor device according to claim 3, wherein the at least one outer filter (10B) comprises a sealing ring (22A) for detachable connection to the inner filter and/or the first and second filter adapters (20A, 20B).

25. Vacuum conveyor device according to claim 4, wherein the at least one outer filter (10B) comprises a sealing ring (22A) for detachable connection to the inner filter and/or the first and second filter adapters (20A, 20B).

26. Vacuum conveyor device according to claim 5, wherein the at least one outer filter (10B) comprises a sealing ring (22A) for detachable connection to the inner filter and/or the first and second filter adapters (20A, 20B).

27. Vacuum conveyor device according to claim 6, wherein the at least one outer filter (10B) comprises a sealing ring (22A) for detachable connection to the inner filter and/or the first and second filter adapters (20A, 20B).

28. Vacuum conveyor device according to claim 7, wherein the at least one outer filter (10B) comprises a sealing ring (22A) for detachable connection to the inner filter and/or the first and second filter adapters (20A, 20B).

29. Vacuum conveyor device according to claim 8, wherein the at least one outer filter (10B) comprises a sealing ring (22A) for detachable connection to the inner filter and/or the first and second filter adapters (20A, 20B).

30. Vacuum conveyor device according to claim 2, wherein the second filter adapter part (20B) is an integral component of a filter plate (20C').

31. Vacuum conveyor device according to claim 3, wherein the second filter adapter part (20B) is an integral component of a filter plate (20C').

32. Vacuum conveyor device according to claim 4, wherein the second filter adapter part (20B) is an integral component of a filter plate (20C').

33. Vacuum conveyor device according to claim 5, wherein the second filter adapter part (20B) is an integral component of a filter plate (20C').

34. Vacuum conveyor device according to claim 6, wherein the second filter adapter part (20B) is an integral component of a filter plate (20C').

35. Vacuum conveyor device according to claim 7, wherein the second filter adapter part (20B) is an integral component of a filter plate (20C').

36. Vacuum conveyor device according to claim 8, wherein the second filter adapter part (20) is an integral component of a filter plate (20C').

37. Vacuum conveyor device according to claim 9, wherein the second filter adapter part (20) is an integral component of a filter plate (20C').

* * * * *